US 12,392,296 B2

(12) United States Patent
Hanrahan et al.

(10) Patent No.: US 12,392,296 B2
(45) Date of Patent: Aug. 19, 2025

(54) POWERPLANT WITH MULTIPLE INTEGRATED GAS TURBINE ENGINES

(71) Applicant: RTX Corporation, Farmington, CT (US)

(72) Inventors: Paul R. Hanrahan, Sedona, AZ (US); Daniel B. Kupratis, Wallingford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/386,816

(22) Filed: Nov. 3, 2023

(65) Prior Publication Data

US 2024/0287942 A1 Aug. 29, 2024

Related U.S. Application Data

(60) Provisional application No. 63/422,488, filed on Nov. 4, 2022.

(51) Int. Cl.
*F02C 6/02* (2006.01)
*F02C 9/18* (2006.01)
*F02K 3/12* (2006.01)

(52) U.S. Cl.
CPC .................. *F02C 9/18* (2013.01); *F02C 6/02* (2013.01); *F02K 3/12* (2013.01); *F23R 2900/03341* (2013.01)

(58) Field of Classification Search
CPC ................ F02C 6/02; F02K 3/12; F02K 3/065
USPC ........................................................ 60/39.15
See application file for complete search history.

(56) References Cited

U.S. PATENT DOCUMENTS

| | | | | |
|---|---|---|---|---|
| 3,282,053 A | * | 11/1966 | Messerschmitt | F02C 3/067 60/269 |
| 3,659,422 A | * | 5/1972 | Hope | F02K 1/1207 60/224 |
| 3,677,012 A | | 7/1972 | Batscha | |
| 3,765,179 A | * | 10/1973 | Strang | F02C 7/042 137/15.1 |
| 4,519,208 A | | 5/1985 | Loisy | |

(Continued)

OTHER PUBLICATIONS

EP search report for EP23207768.5 dated Mar. 14, 2024.

*Primary Examiner* — Lorne E Meade
*Assistant Examiner* — Marc Amar
(74) *Attorney, Agent, or Firm* — Getz Balich LLC

(57) ABSTRACT

A powerplant is provided that includes a first gas turbine engine, a second gas turbine engine, a second engine bypass flowpath and a flow control system. The first gas turbine engine includes a first core flowpath fluidly coupled with a first inlet and a first exhaust. The first core flowpath extends sequentially through a first compressor section, a first combustor section and a first turbine section. The second gas turbine engine a second core flowpath fluidly coupled with a second inlet and a second exhaust. The second core flowpath extends sequentially through a second compressor section, a second combustor section and a second turbine section. The flow control system fluidly couples the first inlet and the first exhaust to the second core flowpath during a first mode. The flow control system fluidly couples the first inlet and the first exhaust to the second engine bypass flowpath during a second mode.

17 Claims, 6 Drawing Sheets

(56) References Cited

U.S. PATENT DOCUMENTS

| | | | | |
|---|---|---|---|---|
| 6,415,597 B1* | 7/2002 | Futamura | ............ | F02C 6/02 60/226.3 |
| 6,834,495 B2* | 12/2004 | Saito | ............ | F02K 3/075 60/226.1 |
| 8,347,600 B2* | 1/2013 | Wichmann | ............ | F02C 9/18 60/39.15 |
| 8,365,514 B1* | 2/2013 | Kupratis | ............ | F02K 3/062 60/262 |
| 9,222,409 B2 | 12/2015 | Kupratis | | |
| 11,143,142 B2 | 10/2021 | Hanrahan | | |
| 2004/0144096 A1* | 7/2004 | Wollenweber | ............ | F02K 3/12 60/39.15 |
| 2005/0210863 A1* | 9/2005 | Wollenweber | ............ | F02C 6/08 60/226.1 |
| 2009/0056309 A1* | 3/2009 | Roberge | ............ | F02C 9/00 60/263 |
| 2013/0239576 A1* | 9/2013 | Kupratis | ............ | F02C 9/18 60/805 |
| 2016/0273393 A1* | 9/2016 | Ekanayake | ............ | F02C 6/02 |
| 2019/0368417 A1* | 12/2019 | Terwilliger | ............ | F02C 9/18 |
| 2020/0032702 A1* | 1/2020 | Kupratis | ............ | F02C 6/02 |
| 2020/0040848 A1* | 2/2020 | Hanrahan | ............ | F02C 3/113 |
| 2023/0358176 A1* | 11/2023 | Hanrahan | ............ | F02C 3/113 |

\* cited by examiner

US 12,392,296 B2

POWERPLANT WITH MULTIPLE INTEGRATED GAS TURBINE ENGINES

This application claims priority to U.S. Provisional Patent Application No. 63/422,488 filed Nov. 4, 2022, which is hereby incorporated herein by reference in its entirety.

BACKGROUND OF THE DISCLOSURE

1. Technical Field

This disclosure relates generally to a powerplant and, more particularly, to a gas turbine engine powerplant.

2. Background Information

Various types and configurations of powerplants are known in the art for an aircraft. While these known aircraft powerplants have various benefits, there is still room in the art for improvement. There is a need in the art, in particular, for an improved multi-engine aircraft powerplant.

SUMMARY OF THE DISCLOSURE

According to an aspect of the present disclosure, a powerplant is provided that includes a first gas turbine engine, a second gas turbine engine, a second engine bypass flowpath and a flow control system. The first gas turbine engine includes a first inlet, a first exhaust, a first compressor section, a first combustor section, a first turbine section and a first core flowpath. The first core flowpath is fluidly coupled with and between the first inlet and the first exhaust. The first core flowpath extends sequentially through the first compressor section, the first combustor section and the first turbine section. The second gas turbine engine includes a second inlet, a second exhaust, a second compressor section, a second combustor section, a second turbine section and a second core flowpath. The second core flowpath is fluidly coupled with and between the second inlet and the second exhaust. The second core flowpath extends sequentially through the second compressor section, the second combustor section and the second turbine section. The second engine bypass flowpath bypasses the second core flowpath. The flow control system is configured to fluidly couple the first inlet and the first exhaust to the second core flowpath during a first mode. The flow control system is configured to fluidly couple the first inlet and the first exhaust to the second engine bypass flowpath during a second mode.

According to another aspect of the present disclosure, another powerplant is provided that includes a first gas turbine engine, a second gas turbine engine and a first engine bypass flowpath. The first gas turbine engine includes a first fan section, a first compressor section, a first combustor section, a first turbine section and a first core flowpath. The first core flowpath extends sequentially through the first compressor section, the first combustor section and the first turbine section. The second gas turbine engine includes a second fan section, a second compressor section, a second combustor section, a second turbine section and a second core flowpath. The second core flowpath extends sequentially through the second compressor section, the second combustor section and the second turbine section. The first engine bypass flowpath is outboard of the first core flowpath and extends sequentially through the first fan section and the second fan section.

According to still another aspect of the present disclosure, another powerplant is provided that includes a first gas turbine engine and a second gas turbine engine. The first gas turbine engine includes a first inlet, a first exhaust, a first compressor section, a first combustor section, a first turbine section and a first core flowpath. The first core flowpath is fluidly coupled with and between the first inlet and the first exhaust. The first core flowpath extends sequentially in a first direction along a centerline through the first compressor section, the first combustor section and the first turbine section. The first core flowpath extends circumferentially about the centerline. The second gas turbine engine includes a second inlet, a second exhaust, a second compressor section, a second combustor section, a second turbine section and a second core flowpath. The second core flowpath is fluidly coupled with and between the second inlet and the second exhaust. The second core flowpath extends sequentially in a second direction along the centerline through the second compressor section, the second combustor section and the second turbine section. The second core flowpath extends circumferentially about the centerline. The second direction is opposite the first direction along the centerline.

The powerplant may also include a second engine bypass flowpath outboard of the second core flowpath. The second core flowpath and the second engine bypass flowpath may be independently fluidly coupled with and downstream of the first engine bypass flowpath.

The powerplant may also include a flow control system configured to fluidly couple a first inlet and a first exhaust to the second core flowpath during a first mode. The flow control system may be configured to fluidly couple the first inlet and the first exhaust to the second engine bypass flowpath during a second mode. The first core flowpath may extend sequentially through the first compressor section, the first combustor section and the first turbine section between the first inlet and the first exhaust.

The first gas turbine engine may be forward of the second gas turbine engine along a centerline.

The flow control system may be configured to: fluidly decouple the first inlet and the first exhaust from the second engine bypass flowpath during the first mode; and/or fluidly decouple the first inlet and the first exhaust from the second core flowpath during the second mode.

The second combustor section may include a combustor. The first inlet and the first exhaust may each be fluidly coupled to the second core flowpath upstream of the combustor during the first mode.

The first inlet may be fluidly coupled to the second core flowpath along the second compressor section during the first mode.

The first inlet may be fluidly coupled to the second core flowpath downstream of the second compressor section during the first mode.

The first inlet may be fluidly coupled to the second core flowpath at a diffuser of the second gas turbine engine during the first mode.

The first core flowpath may extend in a first direction along a centerline within at least one of the first compressor section, the first combustor section or the first turbine section towards the first exhaust. The second core flowpath may extend in a second direction along the centerline within at least one of the second compressor section, the second combustor section or the second turbine section towards the second exhaust. The second direction may be opposite the first direction.

The first gas turbine engine may also include a first rotating structure rotatable about a centerline. The first rotating structure may include a first compressor rotor within the first compressor section and a first turbine rotor within the first turbine section. The second gas turbine engine may also include a second rotating structure rotatable about the centerline. The second rotating structure may include a second compressor rotor within the second compressor section and a second turbine rotor within the second turbine section.

The first rotating structure may be offset from the second rotating structure along the centerline.

The first gas turbine engine may also include a first fan rotor and a first turbine rotor within the first turbine section and configured to drive rotation of the first fan rotor. The second gas turbine engine may also include a second fan rotor and a second turbine rotor within the second turbine section and configured to drive rotation of the second fan rotor.

The first fan rotor may be upstream of the second fan rotor.

The powerplant may also include a first engine bypass flowpath outboard of the first core flowpath. The first fan rotor and the second fan rotor may be within the first engine bypass flowpath.

The second core flowpath and the second engine bypass flowpath may be fluidly coupled in parallel with and downstream of the first engine bypass flowpath.

The first gas turbine engine may also include a first compressor rotor within the first compressor section. The first turbine rotor may be configured to drive rotation of the first compressor rotor. The first turbine rotor may be arranged between the first fan rotor and the first compressor rotor along a centerline.

The second gas turbine engine may also include a second compressor rotor within the second compressor section. The second turbine rotor may be configured to drive rotation of the second compressor rotor. The second compressor rotor may be arranged between the second fan rotor and the second turbine rotor along a centerline.

The powerplant may include a starter configured to drive rotation of a compressor rotor in the second compressor section during the first mode to facilitate startup of the second gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
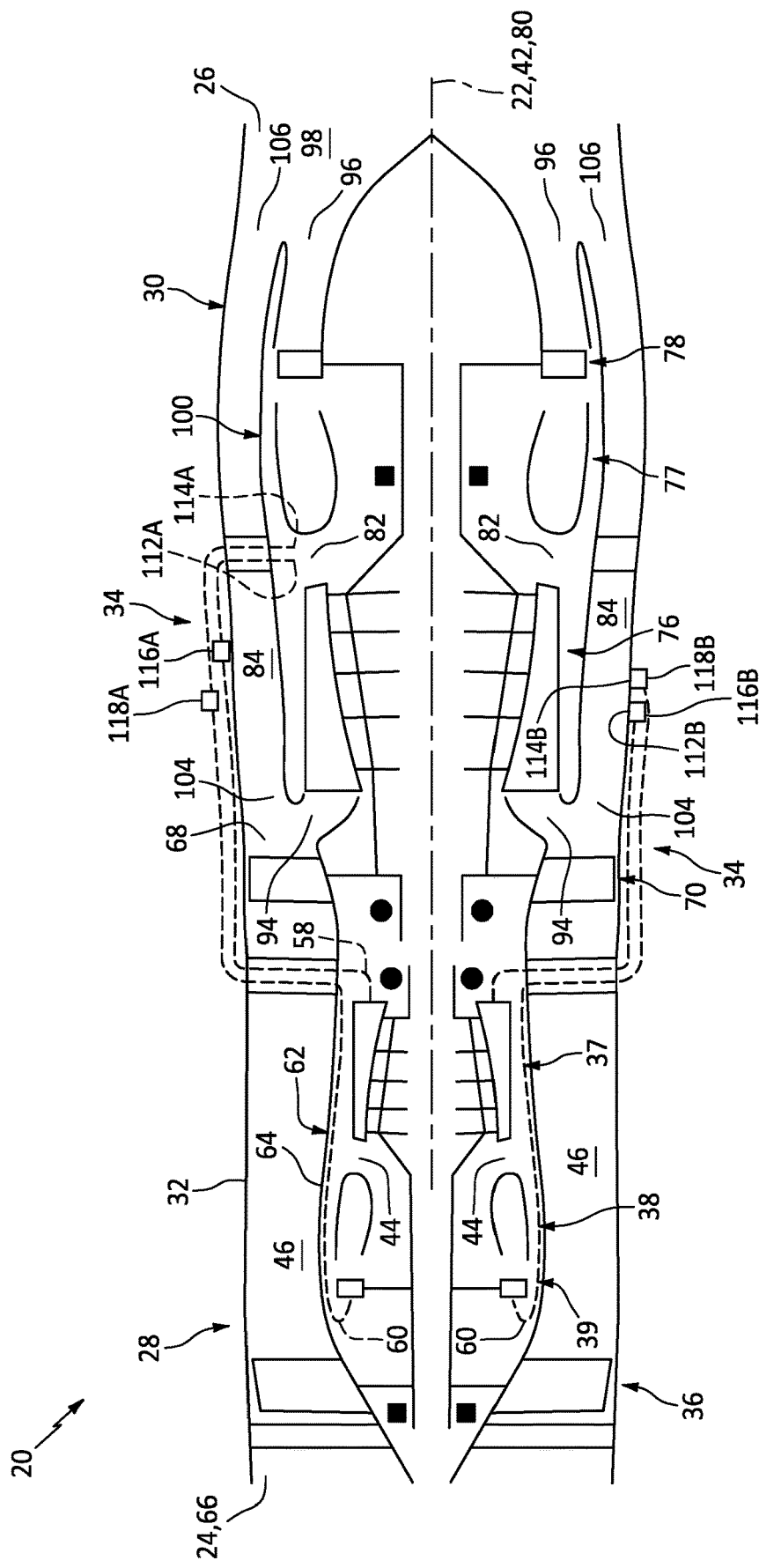
FIG. 1 is a schematic side illustration of a multi-engine powerplant for an aircraft propulsion system.

FIG. 1 is a schematic side illustration of a multi-engine powerplant 20 for an aircraft propulsion system. This powerplant 20 extends axially along an axial centerline 22 of the powerplant 20 from a forward, upstream airflow inlet 24 into the powerplant 20 to an aft, downstream exhaust 26 from the powerplant 20. The powerplant 20 includes a plurality of gas turbine engines 28 and 30 arranged within a common engine housing 32. The powerplant 20 of FIG. 1 also includes an inter-engine flow control system 34.

The gas turbine engines 28 and 30 may be axially offset from (e.g., spaced from, not axially overlap, etc.) one another along the axial centerline 22. The first gas turbine engine 28 of FIG. 1, for example, is arranged (e.g., completely) forward of the second gas turbine engine 30 along the axial centerline 22. With this arrangement, the first gas turbine engine 28 is arranged axially between the powerplant inlet 24 and the second gas turbine engine 30 along the axial centerline 22. The second gas turbine engine 30 is arranged axially between the powerplant exhaust 26 and the first gas turbine engine 28 along the axial centerline 22. Furthermore, the first gas turbine engine 28 may be arranged at the powerplant inlet 24 and/or the second gas turbine engine 30 may be arranged at the powerplant exhaust 26.

Figure 2:
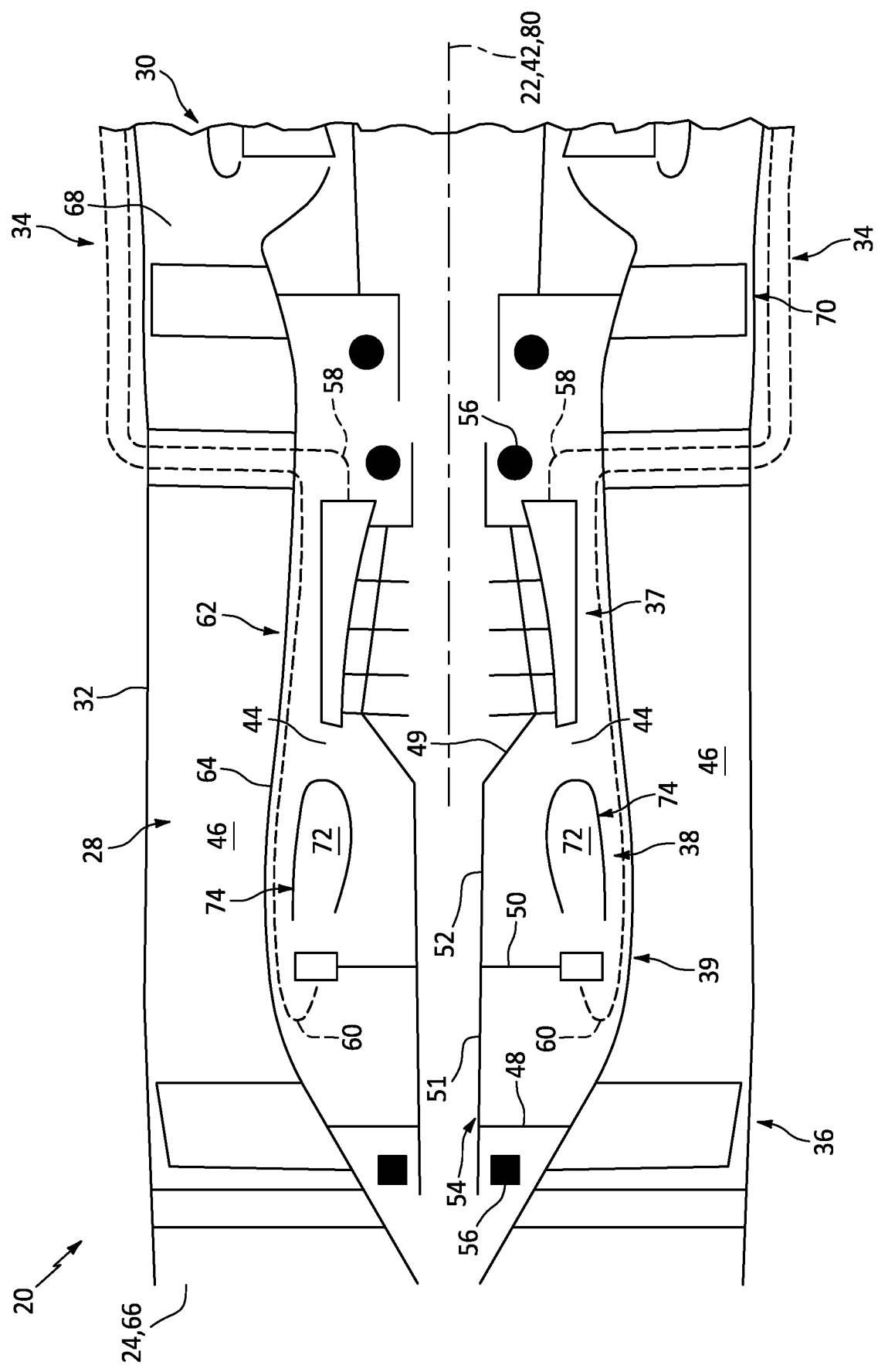
FIG. 2 is a schematic side illustration of a portion of the powerplant of FIG. 1 with a first gas turbine engine.

Referring to FIG. 2, the first gas turbine engine 28 includes a first fan section 36, a first compressor section 37, a first combustor section 38 and a first turbine section 39. These first engine sections 36, 39, 38 and 37 may be arranged sequentially along an axial centerline 42 of the first gas turbine engine 28. This axial centerline 42 may be parallel (e.g., coaxial) with the axial centerline 22. The axial centerline 42 may also be a rotational axis for one or more rotors within the first gas turbine engine 28. The first gas turbine engine 28 may also include and/or otherwise be associated with a first core flowpath 44 and a first engine bypass flowpath 46 (referred to below as "first bypass flowpath").

The first fan section 36, the first compressor section 37 and the first turbine section 39 each include a respective bladed rotor 48-50. Each of these bladed rotors 48-50 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The first fan rotor 48 is connected to and driven by the first turbine rotor 50 through a first fan shaft 51. The first compressor rotor 49 is connected to and driven by the first turbine rotor 50 through a first compressor shaft 52. The first fan shaft 51 and the first compressor shaft 52 may be integral with one another providing a common first engine shaft. Alternatively, the first fan shaft 51 may be discrete from the first compressor shaft 52; e.g., the shafts 51 and 52 may be independently connected to the first turbine rotor 50. In either case, the first turbine rotor 50 may be arranged axially between the first fan rotor 48 and the first compressor rotor 49 along the axial centerline 22, 42. At least (or only) the first fan rotor 48, the first compressor rotor 49, the first turbine rotor 50, the first fan shaft 51 and the first compressor shaft 52 may form a first engine rotating structure 54. This first engine rotating structure 54 is rotatable about the axial centerline 22, 42 and is supported by one or more first engine bearings 56; e.g., rolling element and/or thrust bearings. Each of these first engine bearings 56 is connected to the engine housing 32 by at least one stationary structure such as, for example, an annular support strut.

The first core flowpath 44 includes an inlet 58 to the first core flowpath 44 and an exhaust 60 from the first core flowpath 44. The first core flowpath 44 of FIG. 2 extends from the first core flowpath inlet 58, sequentially through the first compressor section 37, the first combustor section 38 and the first turbine section 39, to the first core flowpath exhaust 60. As the first core flowpath 44 extends towards the first core flowpath exhaust 60, the first core flowpath 44 may extend within and/or through any one or more or all of the first engine sections 37-39 in a first direction along the axial centerline 22, 42, which first direction of FIG. 2 is an axial forward direction. The first core flowpath 44 may also extend circumferentially about (e.g., completely around) the axial centerline 22, 42; e.g., the first core flowpath 44 may be an annular flowpath.

The first bypass flowpath 46 may at least partially or completely bypass a core 62 of the first gas turbine engine 28; e.g., the first engine sections 37-39. The first bypass flowpath 46 of FIG. 2, for example, is disposed radially outside of and extends axially along the first engine core 62. The first bypass flowpath 46 may be formed radially by and between the engine housing 32 and a stationary structure 64 (e.g., a case, a nacelle inner fixed structure, etc.) of the first gas turbine engine 28, where the engine housing 32 may form an outer peripheral boundary of the first bypass flowpath 46, and where the first engine stationary structure 64 may form an inner peripheral boundary of the first bypass flowpath 46.

The first bypass flowpath 46 includes an inlet 66 to the first bypass flowpath 46 and an exhaust 68 from the first bypass flowpath 46, which first bypass flowpath inlet 66 may be the same as the powerplant inlet 24. The first bypass flowpath 46 of FIG. 2 extends from the first bypass flowpath inlet 66, sequentially through the first fan section 36 and a second fan section 70 of the second gas turbine engine 30, to the first bypass flowpath exhaust 68. As the first bypass flowpath 46 extends towards the first bypass flowpath exhaust 68, the first bypass flowpath 46 may extend within and/or through any one or more or all of the fan sections 36 and 70 in a second direction along the axial centerline 22, 42, which second direction of FIG. 2 is an axial aft direction. The first bypass flowpath 46 may also extend circumferentially about (e.g., completely around) the axial centerline 22, 42; e.g., the first bypass flowpath 46 may be an annular flowpath and circumscribe the first engine core 62.

During first gas turbine engine operation, first core gas (e.g., air) enters the first core flowpath 44 through the first core flowpath inlet 58. This first core gas is compressed by the first compressor rotor 49 and directed into a first combustion chamber 72 (e.g., an annular first combustion chamber) of a first combustor 74 (e.g., an annular first combustor) within the first combustor section 38. Fuel is injected into the first combustion chamber 72 by one or more first fuel injectors and mixed with the compressed first core gas to provide a first core fuel-air mixture. This first core fuel-air mixture is ignited by one or more first ignitors and combustion products thereof flow through and cause the first turbine rotor 50 to rotate. The rotation of the first turbine rotor 50 drives rotation of the first compressor rotor 49 and, thus, compression of the gas received from the first core flowpath inlet 58. The rotation of the first turbine rotor 50 also drives rotation of the first fan rotor 48, which propels first bypass air (air received from the powerplant inlet 24) through the first bypass flowpath 46.

Figure 3:
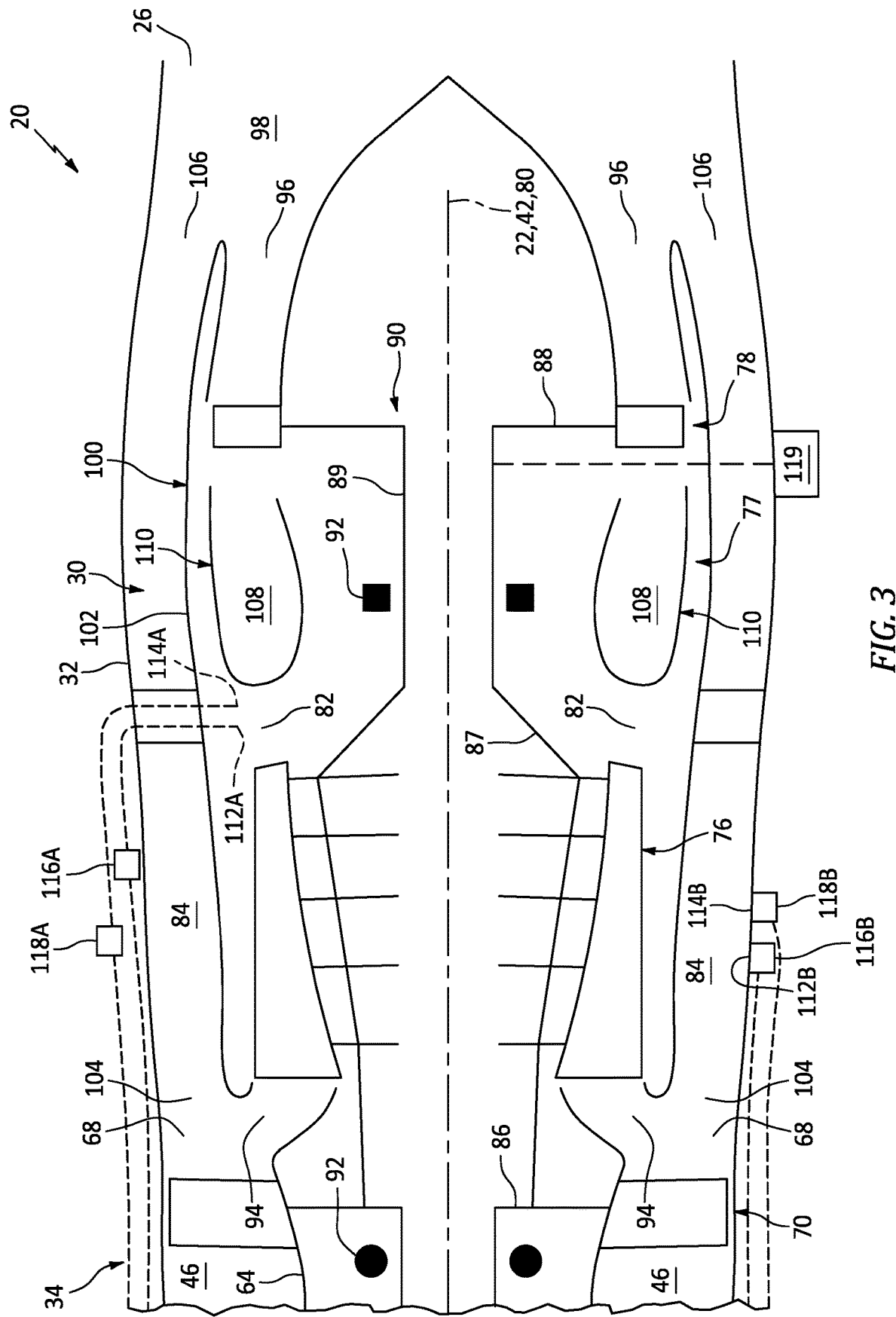
FIG. 3 is a schematic side illustration of a portion of the powerplant of FIG. 1 with a second gas turbine engine.

Referring to FIG. 3, the second gas turbine engine 30 includes the second fan section 70, a second compressor section 76, a second combustor section 77 and a second turbine section 78. These second engine sections 70, 76, 77 and 78 may be arranged sequentially along an axial centerline 80 of the second gas turbine engine 30. This axial centerline 80 may be parallel (e.g., coaxial) with the axial centerline 22, 42. The axial centerline 80 may also be a rotational axis for one or more rotors within the second gas turbine engine 30. The second gas turbine engine 30 may also include and/or otherwise be associated with a second core flowpath 82 and a second engine bypass flowpath 84 (referred to below as "second bypass flowpath").

The second fan section 70, the second compressor section 76 and the second turbine section 78 each include a respective bladed rotor 86-88. Each of these bladed rotors 86-88 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The second fan rotor 86 and the second compressor rotor 87 are connected to and driven by the second turbine rotor 88 through a second engine shaft 89. The second compressor rotor 87 may be arranged axially between the second fan rotor 86 and the second turbine rotor 88 along the axial centerline 22, 42, 80. At least (or only) the second fan rotor 86, the second compressor rotor 87, the second turbine rotor 88 and the second engine shaft 89 may form a second engine rotating structure 90. This second engine rotating structure 90 is rotatable about the axial centerline 22, 42, 80 and is supported by one or more second engine bearings 92; e.g., rolling element and/or thrust bearings. Each of these second engine bearings 92 is connected to the engine housing 32 by at least one stationary structure such as, for example, an annular support strut.

The second core flowpath 82 includes an inlet 94 to the second core flowpath 82 and an exhaust 96 from the second core flowpath 82. The second core flowpath inlet 94 is downstream of and fluidly coupled with the first bypass flowpath 46 and its exhaust 68. The second core flowpath exhaust 96 is upstream of and fluidly coupled with an exhaust flowpath 98, which exhaust flowpath 98 may extend axially within the powerplant 20 to the powerplant exhaust 26. The second core flowpath 82 of FIG. 3 extends from the second core flowpath inlet 94, sequentially through the second compressor section 76, the second combustor section 77 and the second turbine section 78, to the second core flowpath exhaust 96. As the second core flowpath 82 extends towards the second core flowpath exhaust 96, the second core flowpath 82 may extend within and/or through any one or more or all of the second engine sections 76-78 in the second direction along the axial centerline 22, 42, 80. The second core flowpath 82 may also extend circumferentially about (e.g., completely around) the axial centerline 22, 42, 80; e.g., the second core flowpath 82 may be an annular flowpath.

The second bypass flowpath 84 may at least partially or completely bypass a core 100 of the second gas turbine engine 30; e.g., the second engine sections 76-78. The second bypass flowpath 84 of FIG. 3, for example, is disposed radially outside of and extends axially along the second engine core 100. The second bypass flowpath 84 may be formed radially by and between the engine housing 32 and a stationary structure 102 (e.g., a case, a nacelle inner fixed structure, etc.) of the second gas turbine engine 30, where the engine housing 32 may form an outer peripheral boundary of the second bypass flowpath 84, and where the second engine stationary structure 102 may form an inner peripheral boundary of the second bypass flowpath 84. In the embodiment of FIG. 3, the second engine stationary structure 102 is axially separated from the first engine stationary structure 64 by at least (or only) the second core flowpath inlet 94. Of course, in other embodiments, one or more other intermediate structures (e.g., cases, nacelle structures, etc.) may be arranged between the second engine stationary structure 102 and the first engine stationary structure 64.

The second bypass flowpath 84 includes an inlet 104 to the second bypass flowpath 84 and an exhaust 106 from the second bypass flowpath 84. The second bypass flowpath inlet 104 is downstream of and fluidly coupled with the first bypass flowpath 46 and its exhaust 68. With such an arrangement, the second bypass flowpath inlet 104 and the second core flowpath inlet 94 of FIG. 3 may be (e.g., independently) fluidly coupled with the first bypass flowpath 46 in parallel. The second bypass flowpath exhaust 106 is upstream of and fluidly coupled with the exhaust flowpath 98. With such an arrangement, the second bypass flowpath exhaust 106 and the second core flowpath exhaust 96 of FIG. 3 may be (e.g., independently) fluidly coupled with the exhaust flowpath 98 in parallel. The second bypass flowpath 84 of FIG. 3 extends from the second bypass flowpath inlet 104 to the second bypass flowpath exhaust 106. As the second bypass flowpath 84 extends towards the second bypass flowpath exhaust 106, the second bypass flowpath 84 may extend in the second direction along the axial centerline 22, 42, 80. The second bypass flowpath 84 may also extend circumferentially about (e.g., completely around) the axial centerline 22, 42, 80; e.g., the second bypass flowpath 84 may be an annular flowpath and circumscribe the second engine core 100.

During second gas turbine engine operation, second core gas (e.g., air from the first bypass flowpath 46) enters the second core flowpath 82 through the second core flowpath inlet 94. This second core gas is compressed by the second compressor rotor 87 and directed into a second combustion chamber 108 (e.g., an annular second combustion chamber) of a second combustor 110 (e.g., an annular second combustor) within the second combustor section 77. Fuel is injected into the second combustion chamber 108 by one or more second fuel injectors and mixed with the compressed second core gas to provide a second core fuel-air mixture. This second core fuel-air mixture is ignited by one or more second ignitors and combustion products thereof flow through and cause the second turbine rotor 88 to rotate. The rotation of the second turbine rotor 88 drives rotation of the second compressor rotor 87 and, thus, compression of the gas received from the second core flowpath inlet 94. The rotation of the second turbine rotor 88 also drives rotation of the second fan rotor 86, which further propels the first bypass air (downstream of the first fan rotor 48) through the first bypass flowpath 46. Some of this first bypass air is directed into the second core flowpath inlet 94 to provide the second core gas. Some of the first bypass air is directed into and through the second bypass flowpath 84 as second bypass air. This second bypass air may be exhausted from the powerplant 20 with the second core gas through the exhaust flowpath 98 to provide forward thrust.

Referring to FIG. 1, the flow control system 34 is configured to selectively integrate and/or manage operation of the first gas turbine engine 28 with operation of the second gas turbine engine 30. The flow control system 34, for example, may fluidly couple the first core flowpath 44 with the second core flowpath 82 during a first mode of operation (e.g., a series and/or boost mode) and/or may fluidly couple the first core flowpath 44 with the second bypass flowpath 84 during a second mode of operation (e.g., a parallel and/or dash mode). The flow control system 34 may operate in the first mode during, for example, subsonic aircraft flight where the air entering the powerplant inlet 24 is relatively cool. The flow control system 34 may operate in the second mode during, for example, supersonic aircraft flight where the air entering the powerplant 20 is relatively warm; e.g., due to ram air compression of the incoming air. The flow control system 34 of FIG. 1 includes one or more inlets 112A and 112B (generally referred to as "112"), one or more outlets 114A and 114B (generally referred to as "114") and one or more flow regulators 116A and 116B (generally referred to as "116"), 118A and 118B (generally referred to as "118"); e.g., valves, etc.

The first system inlet 112A is fluidly coupled with the second core flowpath 82. This first system inlet 112A is configured to receive (e.g., bleed) the second core gas from the second core flowpath 82, for example upstream of the second combustor 110 within the second combustor section 77. The first system inlet 112A of FIG. 1, for example, is formed by and/or in a component (e.g., a case, vane array, etc.) of the second gas turbine engine 30. The first system inlet 112A may be located in/along the second compressor section 76. Alternatively, the first system inlet 112A may be located in/along the second combustor section 77. For example, the first system inlet 112A may be located at (e.g., on, adjacent or proximate) a diffuser between the second compressor section 76 and a plenum surrounding the second combustor 110. The first system inlet 112A is selectively fluidly coupled to (or decoupled from) the first core flowpath inlet 58 through the first system inlet regulator 116A. This first system inlet regulator 116A is configured to regulate the flow of the second core gas diverted out of the second core flowpath 82 to the first gas turbine engine 28 and its first core flowpath 44.

The first system outlet 114A is fluidly coupled with the second core flowpath 82. This first system outlet 114A is configured to direct the combustion products from the first gas turbine engine 28 into the second core flowpath 82, for example upstream of the second combustor 110 and/or downstream of the first system inlet 112A. The first system outlet 114A of FIG. 1, for example, is formed by and/or in another component (e.g., a case, vane array, etc.) or the component of the second gas turbine engine 30. The first system outlet 114A may be located in/along the second combustor section 77. For example, the first system outlet 114A may be located at (e.g., on, adjacent or proximate) the diffuser. The first system outlet 114A is selectively fluidly coupled to (or decoupled from) the first core flowpath exhaust 60 through the first system outlet regulator 118A. This first system outlet regulator 118A is configured to regulate the flow of the combustion products exhausted from the first core flowpath 44 and directed into the second gas turbine engine 30 and its second core flowpath 82.

The second system inlet 112B is fluidly coupled with the second bypass flowpath 84. This second system inlet 112B is configured to receive (e.g., bleed) the second bypass air from the second bypass flowpath 84. The second system inlet 112B of FIG. 1, for example, is formed by and/or in a component (e.g., a case, vane array, etc.) of the engine housing 32 and/or the second gas turbine engine 30. The second system inlet 112B may be located in/along the second bypass flowpath 84. The second system inlet 112B is selectively fluidly coupled to (or decoupled from) the first core flowpath inlet 58 through the second system inlet regulator 116B. This second system inlet regulator 116B is configured to regulate the flow of the second bypass air diverted out of the second bypass flowpath 84 to the first gas turbine engine 28 and its first core flowpath 44. In the embodiment of FIG. 1, the second system inlet regulator 116B forms the second system inlet 112B. However, in other embodiments, the second system inlet regulator 116B may be discrete from and downstream of the second system inlet 112B.

The second system outlet 114B is fluidly coupled with the second bypass flowpath 84. This second system outlet 114B is configured to direct the combustion products from the first gas turbine engine 28 into the second bypass flowpath 84. The second system outlet 114B of FIG. 1, for example, is formed by and/or in another component (e.g., a case, vane array, etc.) or the component of the engine housing 32 and/or the second gas turbine engine 30. The second system outlet 114B may be located in/along the second bypass flowpath 84. The second system outlet 114B is selectively fluidly coupled to (or decoupled from) the first core flowpath exhaust 60 through the second system outlet regulator 118B. This second system outlet regulator 118B is configured to regulate the flow of the combustion products exhausted from the first core flowpath 44 and directed into the second bypass flowpath 84. In the embodiment of FIG. 1, the second system outlet regulator 118B forms the second system outlet 114B. However, in other embodiments, the second system outlet regulator 118B may be discrete from and upstream of the second system outlet 114B.

During the first mode of operation, the flow control system 34 fluidly couples the first core flowpath 44 with the second core flowpath 82. The first system inlet regulator 116A, for example, opens and fluidly couples the first system inlet 112A to the first core flowpath inlet 58. A quantity (e.g., between fifty and ninety percent (50-90%)) of the second core gas may thereby be bled from the second core flowpath 82 and directed into the first core flowpath 44 as the first core gas. The first system outlet regulator 118A also opens and fluidly couples the first system outlet 114A to the first core flowpath exhaust 60. The combustion products exiting the first turbine section 39 may thereby be exhausted from the first core flowpath 44 and directed into the second core flowpath 82 as additional second core gas. The powerplant 20 may be configured such that a pressure of the second core gas bled from the second core flowpath 82 may be exactly or approximately (e.g., within +/−5%) a pressure of the combustion products directed into the second core flowpath 82. For example, where one of the gas flows has a lower total pressure than the other gas flow, the lower pressure gas flow may flow slower than the other gas flow as the gas flows combine to raise static pressure until the gas flows are in balance. The combustion products of the first turbine section 39, being hotter than the air in the second core flowpath 82, raise the combined temperature of gas entering the second combustion chamber 108, such that a reduced amount of fuel can be added to provide a certain inlet temperature to the second turbine section 78. With the foregoing arrangement, the gas received by the first compressor section 37 is pre-charged by the second compressor section 76; e.g., the second compressor section 76 may function as a low pressure compressor section for the first engine core 62. The first gas turbine engine 28 may thereby have a relatively large overall pressure ratio (OPR); e.g., first engine OPR=first fan section pressure ratio×second fan second pressure ratio×second compressor section pressure ratio/losses through the flow control system 34×first compressor section pressure ratio. This first mode of operation may thereby provide relatively fuel efficient powerplant operation at, for example, subsonic aircraft speeds.

During the first mode of operation, the flow control system 34 may also fluidly decouple the first core flowpath 44 from the second bypass flowpath 84. The second system inlet regulator 116B and/or the second system outlet regulator 118B, for example, may be closed. However, it is contemplated in other embodiments, the flow control system 34 may fluidly couple the first core flowpath 44 to both the second core flowpath 82 and the second bypass flowpath 84, for example, during a transition from the second mode of operation to the first mode of operation, etc.

During the second mode of operation, the flow control system 34 fluidly couples the first core flowpath 44 with the second bypass flowpath 84. The second system inlet regulator 116B, for example, opens and fluidly couples the second system inlet 112B to the first core flowpath inlet 58. A quantity (e.g., notionally the same as the quantity that was bled from the second core in the first mode of operation) of gas may thereby be bled from the second bypass flowpath 84 and directed into the first core flowpath 44 as the first core gas. The second system outlet regulator 118B also opens and fluidly couples the second system outlet 114B to the first core flowpath exhaust 60. The combustion products exiting the first turbine section 39 may thereby be exhausted from the first core flowpath 44 and directed into the second bypass flowpath 84 as additional second bypass gas. The powerplant 20 may be configured such that a pressure of the second bypass air bled from the second bypass flowpath 84 may be exactly or approximately (e.g., within +/−5%) a pressure of the combustion products directed into the second bypass flowpath 84. With the foregoing arrangement, the gas received by the first compressor section 37 is not pre-charged by the second compressor section 76. The first gas turbine engine 28 may thereby have a relatively low overall pressure ratio (OPR); e.g., first engine OPR=first fan section pressure ratio×second fan second pressure ratio/losses through the flow control system 34×first compressor section pressure ratio. Here, the combustion products exhausted from the first core flowpath 44 may be relatively low temperature since the second core gas is bled from the second bypass flowpath 84 rather than the second core flowpath 82. The powerplant 20 may therefore accommodate higher temperature inlet air through the powerplant inlet 24 at, for example, supersonic aircraft speeds. Reducing the first core gas inlet temperature may also facilitate an increase in fuel-to-air ratio (FAR) to increase first gas turbine power.

Furthermore, reducing first core gas inlet temperature and pressure into the first core flowpath 44 may compel a reduction in first gas turbine engine power and subsequently in first fan rotor speed. Reducing first core gas inlet temperature may reduce the mechanical-to-corrected speed parameter of the first compressor rotor 49 such that to maintain a similar corrected speed in both modes, it mechanically rotates slower in this second mode. The first fan rotor 48, which has not been reduced in mechanical-to-corrected speed, and which rotates in a common speed through shaft 51, may then rotate at a reduced corrected speed (e.g., see FIG. 4).

Figure 4:
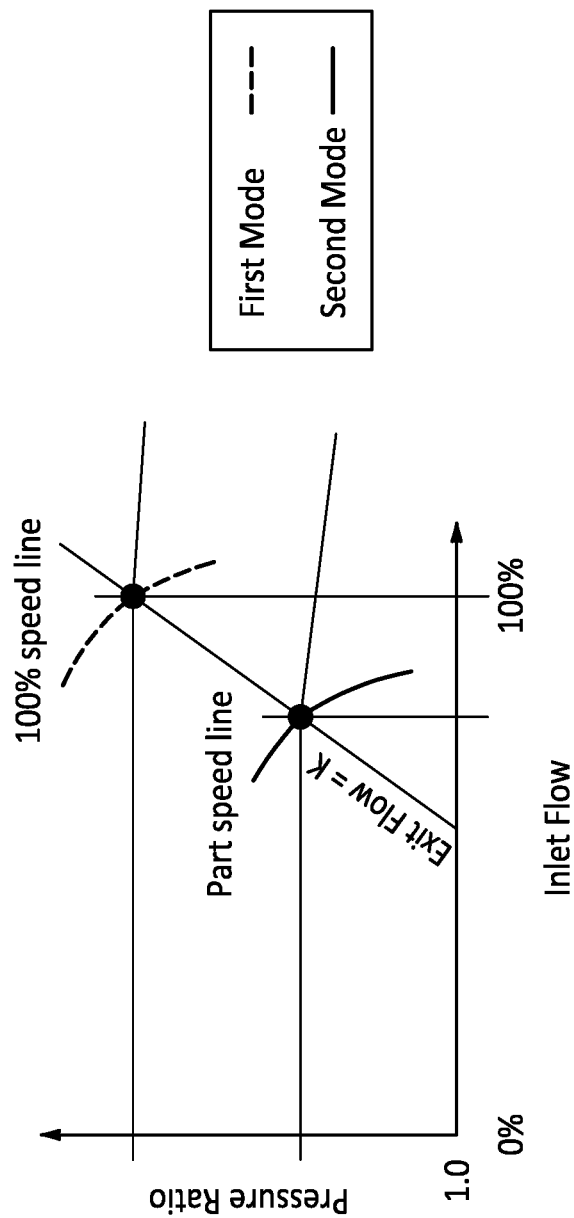
FIG. 4 is a graph depicting a first gas turbine engine pressure ratio during various modes of operation.

Continuing to look at FIG. 4, it is considered that a reduction in fan speed warrants reductions in both fan inlet flow and fan pressure ratio, and that a balance exists where reductions in inlet flow and pressure ratio together may maintain a constant exit flow. It is contemplated that an increase in first gas turbine engine power from a higher FAR facilitated in the second mode can balance the reduction in first gas turbine engine power compelled by a reduction in first core gas inlet temperature and pressure, and the reduction in speed of the fan rotor 48, such that the amount of exit flow from the first fan section 36 through the first bypass flowpath 46 to the second fan section 70 can remain notionally the same in both modes.

During the second mode of operation, the flow control system 34 may also fluidly decouple the first core flowpath 44 from the second core flowpath 82. The first system inlet regulator 116A and/or the first system outlet regulator 118A, for example, may be closed. However, it is contemplated in other embodiments, the flow control system 34 may fluidly couple the first core flowpath 44 to both the second core flowpath 82 and the second bypass flowpath 84, for example, during a transition from the first mode of operation to the second mode of operation, etc.

During the second mode of operation, the second turbine engine 30 may not receive the combustion products of first turbine 39 into flowpath 82 to preheat the air entering combustor 108, so more fuel may be added to achieve a certain second turbine inlet temperature than in the first mode of operation.

In some embodiments, referring to FIG. 3, the flow control system 34 may operate in the first mode during startup of the powerplant 20; e.g., when neither gas turbine engine 28, 30 is operating. This powerplant startup may describe an initial startup of the powerplant 20 when the aircraft is on ground and stationary. The powerplant startup may also or alternatively describe a restart of the powerplant 20 during aircraft flight. During such powerplant startup, a starter 119 may drive rotation of the second compressor rotor 87 to provide the compressed air to the second combustor section 77 to facilitate startup of the second gas turbine engine 30. Here, the second gas turbine engine 30 may be started prior to (or concurrently with) starting of the first gas turbine engine 28. To reduce a load of the second compressor rotor 87 on the starter 119, the flow control system 34 may open the flow regulators 116A and 118A to bleed off at least some of the air from the second compressor section 76/the second core flowpath 82. By reducing the load of the second compressor rotor 87 on the starter 119, a power output of the starter 119 may be reduced. Examples of the starter 119 include, but are not limited to, an electric machine (e.g., a dedicated starter motor or a motor-generator) or another drive device (e.g., a pneumatic motor, etc.).

Figure 5A:
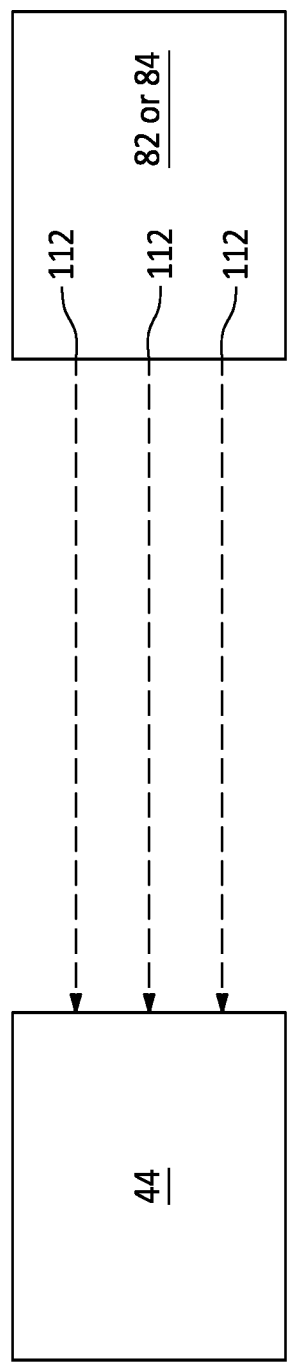
FIGS. 5A and 5B are schematic illustrations of alternative passage arrangements between flowpaths of the powerplant of FIG. 1.
Figure 5B:
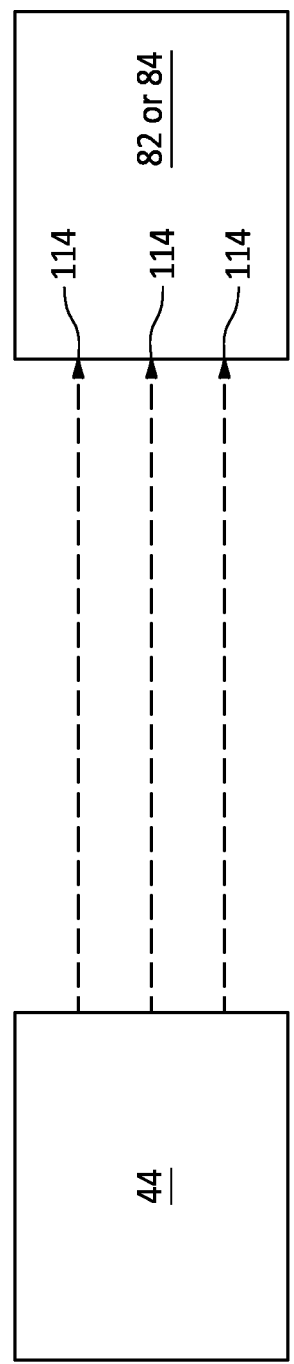

In some embodiments, referring to FIG. 1, the flow control system 34 may include a single first system inlet 112A, a single first system outlet 114A, a single second system inlet 112B and a single second system outlet 114B. In other embodiments, referring to FIGS. 5A and 5B, the flow control system element 112, 114 may be one of a plurality of the elements 112, 114. For example, the flow control system 34 of FIG. 5A includes two or more of the system inlets 112 for bleeding the gas from the respective second flowpath 82, 84 for the first core flowpath 44. In another example, the flow control system 34 of FIG. 5B includes two or more of the system outlets 114 for exhausting the combustion products from the first core flowpath 44 to the respective second flowpath 82, 84.

Figure 6B:
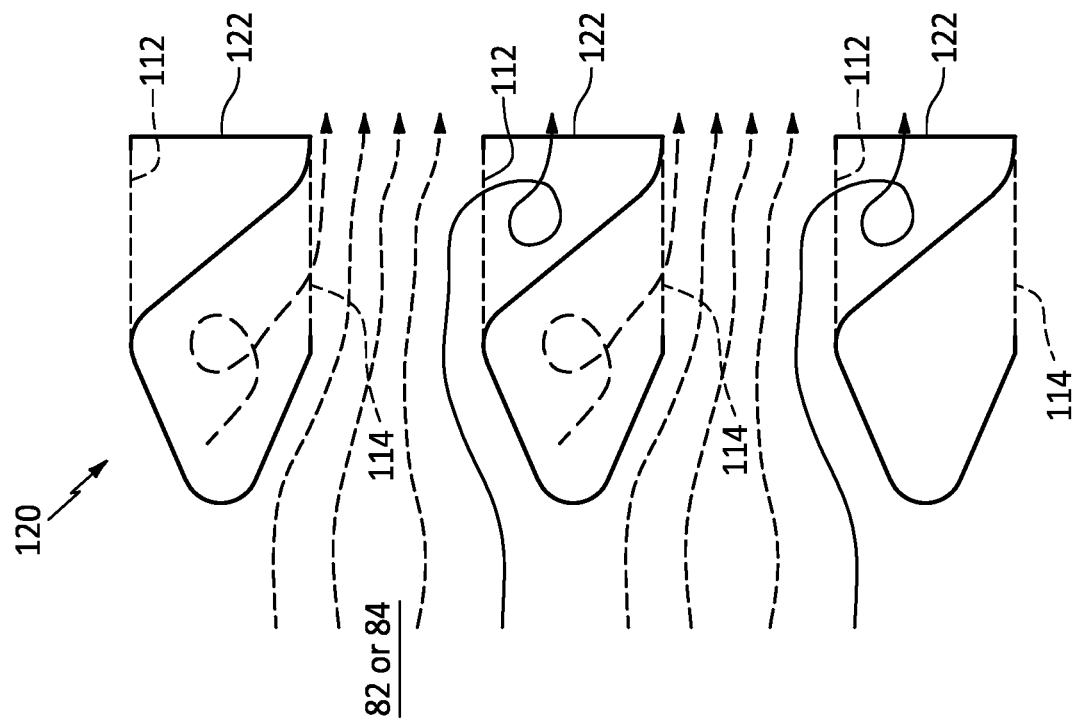
FIGS. 6A and 6B are illustrations of a section of a vane array during various modes of operation.
Figure 6A:
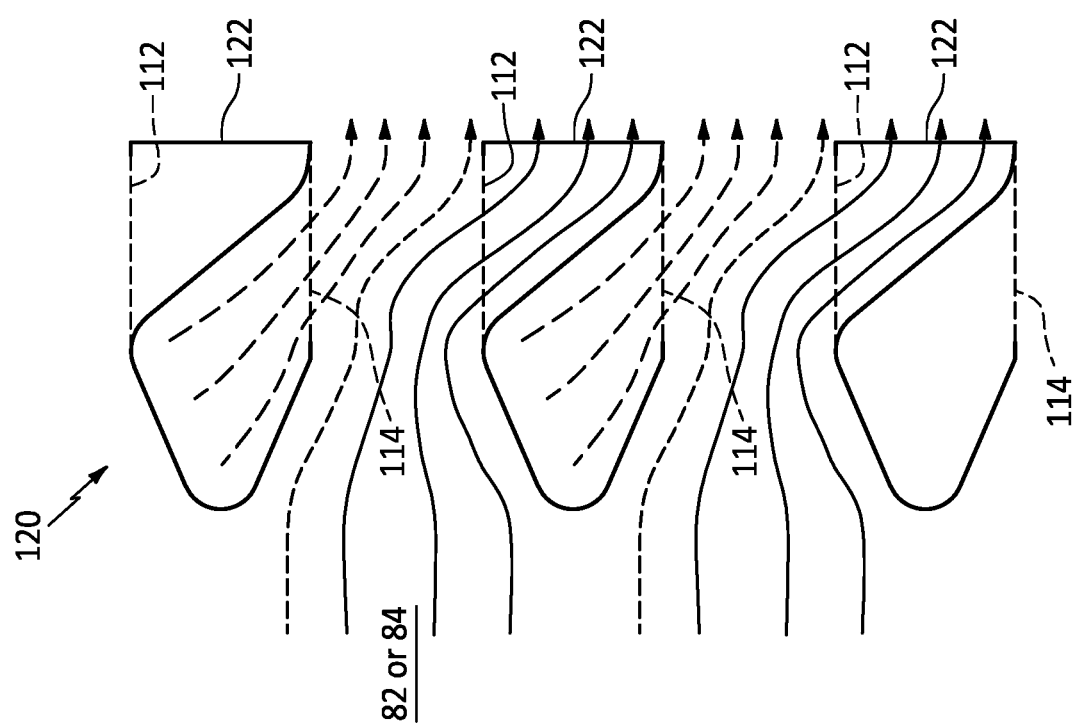

In some embodiments, referring to FIGS. 6A and 6B, a respective set of the system inlet(s) 112 and the system outlet(s) 114 may be arranged in a vane array 120 (or strut array). The vane array 120 of FIGS. 6A and 6B, for example, includes a plurality of vanes 122 (or struts) which extend across the respective flowpath 82, 84. Each set of the system inlet(s) 112 and the system outlet(s) 114 may be disposed with a respective one of the vanes 122. Each system inlet 112 may be on one side of the respective vane 122, while a respective system outlet 114 may be on another side of the respective vane 122. Referring to FIG. 6A, when the corresponding regulators 116, 118 (see FIG. 1) are open, the vane array 120 may be configured to facilitate a quantity of blowby through the vane array 120. This blowby may serve to separate the gas flowing into the system inlet(s) 112 and the gas flowing out of the system outlet(s) 114. Referring to FIG. 6B, when the corresponding regulators 116, 118 (see FIG. 1) are closed, the gas at the system inlet(s) 112 and the system outlet(s) 114 may stagnate and most if not all of the gas may flow through/axially across the vane array 120.

Each engine core 62, 100 may have various configurations other than those described above. Each engine core 62, 100, for example, may be configured with a single spool (see FIG. 1), with two spools, or with more than two spools. Each engine core 62, 100 may be configured with one or more axial flow compressor sections, one or more radial flow compressor sections, one or more axial flow turbine sections and/or one or more radial flow turbine sections. Each engine core 62, 100 may be configured with any type or configuration of annular, tubular (e.g., CAN), axial flow and/or reverser flow combustor. The present disclosure therefore is not limited to any particular types or configurations of gas turbine engine cores. Furthermore, while the powerplant 20 is described above for an aircraft propulsion system, the powerplant 20 of the present disclosure is not limited to such an exemplary application.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant, comprising:
a first gas turbine engine including a first inlet, a first exhaust, a first compressor section, a first combustor section, a first turbine section and a first core flowpath fluidly coupled with and between the first inlet and the first exhaust, the first core flowpath extending sequentially through the first compressor section, the first combustor section and the first turbine section;
a second gas turbine engine including a second inlet, a second exhaust, a second compressor section, a second combustor section, a second turbine section and a second core flowpath fluidly coupled with and between the second inlet and the second exhaust, the second core flowpath extending sequentially through the second compressor section, the second combustor section and the second turbine section;
a second engine bypass flowpath bypassing the second core flowpath; and
a flow control system configured to fluidly couple the first inlet and the first exhaust to the second core flowpath during a first mode, and the flow control system configured to fluidly couple the first inlet and the first exhaust to the second engine bypass flowpath during a second mode.

2. The powerplant of claim 1, wherein the flow control system is configured to
fluidly decouple the first inlet and the first exhaust from the second engine bypass flowpath during the first mode; and
fluidly decouple the first inlet and the first exhaust from the second core flowpath during the second mode.

3. The powerplant of claim 1, wherein
the second combustor section comprises a combustor; and
the first inlet and the first exhaust are each fluidly coupled to the second core flowpath upstream of the combustor during the first mode.

4. The powerplant of claim 1, wherein the first inlet is fluidly coupled to the second core flowpath along the second compressor section during the first mode.

5. The powerplant of claim 1, wherein the first inlet is fluidly coupled to the second core flowpath downstream of the second compressor section during the first mode.

6. The powerplant of claim 1, wherein the first inlet is fluidly coupled to the second core flowpath at a diffuser of the second gas turbine engine during the first mode.

7. The powerplant of claim 1, wherein
the first core flowpath extends in a first direction along a centerline within at least one of the first compressor section, the first combustor section or the first turbine section towards the first exhaust;
the second core flowpath extends in a second direction along the centerline within at least one of the second compressor section, the second combustor section or the second turbine section towards the second exhaust; and
the second direction is opposite the first direction.

8. The powerplant of claim 1, wherein
the first gas turbine engine further includes a first rotating structure rotatable about a centerline, the first rotating structure includes a first compressor rotor within the first compressor section and a first turbine rotor within the first turbine section; and
the second gas turbine engine further includes a second rotating structure rotatable about the centerline, the second rotating structure includes a second compressor rotor within the second compressor section and a second turbine rotor within the second turbine section.

9. The powerplant of claim 8, wherein the first rotating structure is offset from the second rotating structure along the centerline.

10. The powerplant of claim 1, wherein
the first gas turbine engine further includes a first fan rotor and a first turbine rotor within the first turbine section and configured to drive rotation of the first fan rotor; and
the second gas turbine engine further includes a second fan rotor and a second turbine rotor within the second turbine section and configured to drive rotation of the second fan rotor.

11. The powerplant of claim 10, wherein the first fan rotor is upstream of the second fan rotor.

12. The powerplant of claim 10, further comprising:
a first engine bypass flowpath outboard of the first core flowpath;
the first fan rotor and the second fan rotor within the first engine bypass flowpath.

13. The powerplant of claim 12, wherein the second core flowpath and the second engine bypass flowpath are fluidly coupled in parallel with and downstream of the first engine bypass flowpath.

14. The powerplant of claim 10, wherein
the first gas turbine engine further includes a first compressor rotor within the first compressor section;
the first turbine rotor is configured to drive rotation of the first compressor rotor; and
the first turbine rotor is arranged between the first fan rotor and the first compressor rotor along a centerline.

15. The powerplant of claim 10, wherein
the second gas turbine engine further includes a second compressor rotor within the second compressor section;
the second turbine rotor is configured to drive rotation of the second compressor rotor; and
the second compressor rotor is arranged between the second fan rotor and the second turbine rotor along a centerline.

16. The powerplant of claim 10, further comprising a starter configured to drive rotation of a compressor rotor in the second compressor section during the first mode to facilitate startup of the second gas turbine engine.

17. A powerplant, comprising:
a first gas turbine engine including a first fan section, a first compressor section, a first combustor section, a first turbine section and a first core flowpath extending sequentially through the first compressor section, the first combustor section and the first turbine section;
a second gas turbine engine including a second fan section, a second compressor section, a second combustor section, a second turbine section and a second core flowpath extending sequentially through the second compressor section, the second combustor section and the second turbine section;
a first engine bypass flowpath outboard of the first core flowpath and extending sequentially through the first fan section and the second fan section;
the first gas turbine engine arranged forward of the second gas turbine engine along a common axial centerline;
a second engine bypass flowpath outboard of the second core flowpath, the second core flowpath and the second engine bypass flowpath independently fluidly coupled with and downstream of the first engine bypass flowpath; and
a flow control system configured to fluidly couple a first inlet and a first exhaust to the second core flowpath during a first mode, the flow control system configured to fluidly couple the first inlet and the first exhaust to the second engine bypass flowpath during a second mode, and the first core flowpath extending sequentially through the first compressor section, the first combustor section and the first turbine section between the first inlet and the first exhaust.

* * * * *